United States Patent [19]

Freeman et al.

[11] Patent Number: 4,677,546

[45] Date of Patent: Jun. 30, 1987

[54] GUARDED REGIONS FOR CONTROLLING MEMORY ACCESS

[75] Inventors: Martin Freeman; Cecil H. Kaplinsky, both of Palo Alto, Calif.

[73] Assignee: Signetics, Sunnyvale, Calif.

[21] Appl. No.: 641,793

[22] Filed: Aug. 17, 1984

[51] Int. Cl.[4] .................. G06F 12/14; G06F 12/00
[52] U.S. Cl. .................................................. 364/200
[58] Field of Search ... 364/200 MS File, 900 MS File

[56] References Cited

U.S. PATENT DOCUMENTS

| 4,038,645 | 7/1977 | Birney et al. | 364/200 |
|---|---|---|---|
| 4,084,227 | 4/1978 | Bennett | 364/200 |
| 4,099,256 | 7/1978 | Draper | 364/900 |
| 4,231,088 | 10/1980 | Hammer et al. | 364/200 |
| 4,300,192 | 11/1981 | Couleur et al. | 364/200 |
| 4,355,355 | 10/1982 | Butwell et al. | 364/200 |
| 4,388,685 | 6/1983 | Kotok et al. | 364/200 |
| 4,442,484 | 4/1984 | Childs et al. | 364/200 |

Primary Examiner—Raulfe B. Zache
Assistant Examiner—William G. Niessen

[57] ABSTRACT

In a virtual memory system, a guarded region allows access to protected code and data without intervention from a processor's operating system by redefining regions of an address space with reference to gates indicating points of entry for those regions. A non-hierarchial access path in the form of a tree-like structure permits a process to access resources and data while controlling access thereto and return therefrom.

13 Claims, 2 Drawing Figures

GUARDED REGIONS FOR CONTROLLING MEMORY ACCESS

CROSS-REFERENCE TO RELATED APPLICATIONS

This application is related to U.S. patent application Ser. No. 581,388, filed Feb. 17, 1984, entitled Memory Access Controller, which is incorporated herein by reference, and U.S. patent application Ser. No. 641,814, filed Aug. 17, 1984, entitled Combining Attribute Bits in Descriptors Associated with Virtual Memory Systems, which is also incorporated herein by reference.

BACKGROUND OF THE INVENTION

1. Field of the Invention

The present invention pertains to techniques for limiting access to certain addresses in the memory of a computer system. The guarded region is a protection mechanism which allows protected access to code and data without involving the operating system or without involving the supervisory state of the processor. The guarded region gives quick access to protected resources, provides a form of dynamic linking of routines to manipulate these resources and provides a protected access path to a resource on a need-to-know basis.

2. Description of the Prior Art

Hardware-based protection schemes have become necessary in producing reliable software. Protection mechanisms allow software errors to be detected earlier in the development cycle, and can prevent errant software from corrupting properly running software neighbors. Protection schemes may be complex and difficult to use, but most schemes seek to restrict access to portions of an address space.

Virtual memory management hardware contains a mapping mechanism that translates "virtual addresses," issued by the processor, into the physical addresses of the RAM. If the virtual to physical translation cannot be made (because the required data is still resident on disk), the processor is interrupted (even if in the middle of an instruction) and forced to enter the operating system memory management routine. This routine initiates a transfer from the disk to RAM. If necessary, it will first move blocks from RAM to disk to make space. Once started, these disk transfers take place under program control while the processor also executes other instructions.

There are many ways to map the virtual to physical addresses. In order to reduce the size of the mapping table, this is not done at a word level but in groups of consecutive words. Two main schemes are popular. The first maps a fixed-length page. A typical page, which is essentially a trick by the hardware to subdivide artificially the address space, consists of 512 to 4096 consecutive bytes that are mapped, as a whole, onto a location on the disk or into the RAM.

The alternative scheme is to use segments. A segment is a variable length section of the address space that is a logical entity to the programmer and is mapped as a whole onto the disk and/or the RAM address space Typical segment sizes vary from a few bytes to the whole address space.

Some system architectures (e.g. an IBM 370) allow the programmer to divide logical segments to separate logically distinct entities (a module of code, a stack, data etc.) but the granularity of segment length is fairly large, around 2K bytes. The segment is physically split into pages that are individually mapped onto the various memory hierarchies. This allows easy placement of pages in memory while providing the programmer with a method of dividing the address space into logically distinct segments.

While segments allow subdivision of programs and data into intellectually manageable chunks, a known division of the address space between the program and the operating system has to be defined. Ideally, one would like to embed this division into two separate address spaces. The 68010 (Motorola) processor allows this to be done by hardware using the FC2 pin. However, this arrangement slows down operating system calls because all parameters have to be transferred between the two spaces by means of a special instruction.

Computers such as the VAX (Digital Equipment Corporation) use a different solution. They divide the address space into "regions," each with its own translation table so it can be managed individually. The operating system kernel has access to all regions and can thus easily get at the process-dependent data. However, user-generated programs do not have access to the system address space for security reasons. The 32-bit address space of a VAX is divided into three fixed size regions.

A memory management unit (MMU) provides mechanisms which include memory mapping and protection of access. A user's program may be protected in a number of ways. Each address may be tagged with an indication of the address space it is associated with. Accessing an address space without permission causes a system error; e.g. accessing the supervisor data space without having supervisor permission. In general, the whole system address space may be broken up into subspaces, where permission is necessary to access a subspace. Permission may be associated with a processor mode, and processor mode change instructions used to change permission levels. Typically, a trap instruction is used to change a processor's mode from user to supervisor. Once in supervisor mode, supervisor permission is granted.

Operating systems use this technique to implement system calls. The trap amounts to a controlled jump into the supervisor space, while at the same time changing processor mode. Processor modes, then, provide a coarse-grained form of access protection. Access protection via processor modes has its drawbacks which include: (1) changing and restoring processor state, (2) mapping or moving arguments in the calling address space to the called address space, and (3) validating the size and composition of arguments. For instance, implementing a supervisory call in a typical operating system would involve invoking a trap instruction, determining the trap type, getting the supervisory call arguments, and validating those arguments. This application details a new mechanism for access protection that is more general than the typical processor mode protection, simpler to use, and more efficient, particularly when protection capabilities are not uniform across user processes.

Address spaces must first be delimited in order to be protected. One standard technique is to partition an address space into segments—variable—sized sections of memory. A related group of segments determines an address space. Typically, a segment is identified by a segment descriptor, and an address space is identified by a table made up of segment descriptors; i.e. a segment table. A process's address space can be partitioned into variable-sized regions, each having its own segment table. One region might contain the operating system kernel, another the user's code, and yet still another library code common to all processes. Regions allow sharing of code. Each region has associated with it a segment table pointer and a segment table length. Typically, these values are present in special registers.

In most existing system implementations today, hardware does not contain any provision for altering such protection mechanisms. All protection is done by the software. Calls to protected routines cause a hardware trap or supervisor call. The context or state of the current instruction running in the processor is stored and new context is loaded. This new program examines the request, and, if it is granted, a new context is created that permits entry to the requested routine. Typically, this takes up to 300 microseconds.

Existing systems with additional protection facilities divide the address space into a set of hierarchical concentric rings, where the radius of each ring is an address. In any given ring, a program has access to the address space of its own ring and the address space of all the rings outside itself. Ring crossing through inside rings is controlled by gates that give the entry points at which rings may be entered. Though rudimentary and hierarchical, this technique clearly works, and allows protected systems to be built.

The guarded region technique presented herein not only restricts access to a portion of an address space, but also allows its re-definition. Depending on the associated system software, multiple definitions may exist for the same software routine. An embodiment of this scheme can be found in the Signetics Memory Access Controller (MAC). This present disclosure seeks to detail the general idea behind guarded regions and to discuss its embodiment in the Signetics Memory Access Controller (MAC), designated SCC 68910 and SCC 68920.

SUMMARY OF THE INVENTION

The Signetics Memory Access Controller addresses the combining of the following features on a single chip of silicon: problems of putting systems together, the processor/memory speed mismatch, translation of virtual addresses, control of several memory hierarchies, buffering of bus accesses and control of virtual I/O. The net result of combining these features onto the Signetics 68910 and 68920 Memory Access Controllers is to allow system designers to convert a "computing nucleus" (a 68010 or 68020 microprocessor) into systems with the throughput of a VAX. The resulting system, which offers a variety of user-selectable virtual memory schemes, can be expanded into a multiprocessor system by the addition of one or more processor/MAC pairs and small changes to the lowest level of the operating system.

Not all of these features need be used. The 90,000 transistors of the MAC not only implement these features, but also provide selection registers so the user can pick any feature subset.

One important feature is that the MAC allows users to define their own protection schemes; the choices include no protection, "normal" protection as used in virtual memory systems, and a capability-like, guarded region design, the first of its kind to be implemented on silicon.

System designers can subdivide the address space into one to four regions, but, unlike the VAX, if a region is not used, it does not subtract from the address space available to the other regions. The only restrictions on regions that apply are that they be continuous within a partition and that the partitions be contiguous. Each region has its own translation tables and can vary in length from 3.25% to 100% of the total address space.

The MAC allows a process's virtual address space to be partitioned in up to four sections known as regions. Regions are useful for sharing code and data. For instance, a process may have four regions where region 0 is dedicated to the operating system kernel, region 2 is dedicated to a system library, and region 3 is dedicated to process specific code and data.

Sharing at this level is quite useful. In a typical UNIX program there may be several references to the system subroutine library. A small program may increase its size several fold when it is linked with routines from this library. The aforementioned system library region would save this code replication for every linked program—each subroutine entry point would be a fixed member of the virtual space of each program.

Associated with each of the four possible regions is a segment table. When the contents of a virtual location cannot be found with on-chip MAC resources, the MAC does a table walk through main memory. It determines the appropriate segment table to start this walking procedure by mapping the most significant five bits of the virtual address into a region number.

The MAC, then, works with a virtual address space that is split into 32 pieces. The region partitions contain a number of these pieces. Thus, an example two region system might have 12 pieces in region 0 and 20 pieces in region 1.

To support four regions the MAC contains four register pairs; a register pair consisting of a segment table pointer register and a segment table length register.

A typical system is configured with three regions. One contains the operating system kernel; the second contains all the shared utilities and libraries and the third contains the user program and data. Normally the first two remain unchanged while the third naturally changes as different programs commence execution.

Memory System Protection

Memory protection—the ability to define and structure access to each region, segment or page, is normally implemented by including the protection information with the translation tables. The Memory Access Controllers 68910 and 68920 follow this pattern. Each entity, either a segment or a page, can be given at least five protection attributes:

1. Accessible only in system state;
2. Executable—i.e., can be run as a program;
3. Can be read as data;
4. Writeable;
5. Invalid—i.e., mapping does not exist.

If a non-allowed access is made (i.e., the processor tries to execute code from a page that is non-executable), the MAC will not complete the memory access; instead, it generates a bus error (BERR) signal to the processor so that the operating system can decide what should be done.

All protection bits can be used at either the segment or the page level, depending upon which scheme is used. In addition, if a permission is granted at one level, it can be turned off at another level. This allows operating systems that use "Copy On Write" to be easily implemented. These protection attributes are discussed more fully in the copending applications cross-referenced above.

The MAC's protection abilities go beyond these five attributes. In general, protection is performed by two interacting mechanisms. The first and simplest is, "If you can't see it, you can't access it." It is implemented in a mapping table. Since all virtual addresses issued by the processor are translated via the mapping table into physical addresses, if the mapping is marked invalid, the program cannot access that address or module.

This constitutes a rudimentary form of memory protection capability, where a process is given an explicit set of access rights to the objects or modules that it needs, but no others. However, these access rights must be augmented to achieve an efficient, fully protected system. One powerful mechanism available with the MAC is to ensure that extensions to currently available code and data can be requested, and granted, dynamically.

To guarantee that the added code is used as intended, it is necessary to restrict code access to a set of given entry points. In turn, access to extra code generates a need to also access other data. For example, if a file system implements a set of entry points (say one for read, one for write, one for open and one for close), then the code to perform these actions needs access to some system-wide tables that embody the state of the file system. However, these tables should be hidden from the user program.

In addition, the file system needs to read and write to the disk, a task that calls on routines that themselves need data that should remain hidden from the file system.

Guarded Regions

Besides the typical access protection associated with permission bits on segment and page descriptors, the MAC provides additional protection through a scheme known as guarded regions. A guarded region is a region that may only be entered through fixed entry points that are defined by gates.

A gate consists of a segment table pointer, a segment table length, and an entry point. When permission is granted, the region is redefined by the gate's segment table pointer and segment table length fields, and the program counter is set to the gate's entry point. The user process is now executing code in a region whose contents has just been re-defined. When returning from this gate call, the process picks up from the point after the gate call. Just like subroutine calls, gate calls can be nested.

Thus, gates are capabilities to routines that cannot be gotten to in any other way. The guarded region containing these routines is not initially a part of the process's address space, but temporarily becomes a part of it. This is in distinction to the approach of rings of protection where all routines are in a process's address space, but without the appropriate gate at the right ring level, access cannot be achieved.

The MAC provides hardware support for a similar protection system called "Guarded Regions." In this concept, a segment (marked in its descriptor as a gate segment) contains a list of gates. Each gate contains an allowed entry point as well as pointers to new context information. This information contains a new list of mapping tables as well as a new list of gates. Thus, a new set of routines can be made available as the addresses now have a valid, or new, mapping. Data tables are made available in the same way. On entering a gate, the return information is placed on a special stack, not accessible to software, and is used on exit from a guarded region.

The actual mechanism to be implemented can be defined by the system designer by writing a small section of code that is run by the microprocessor/MAC pair under special, carefully guarded conditions. Gates are replaced when a guarded region is entered, thus, no check need be done on entry as the fact that the gate was available to the calling program implies that it had permission to use the gate.

Each program can have a set of entry point gates to the file system. When one is used, then and only then is the code to perform the actions and the tables defining the state available to the processor. In addition, the new set of gates will give the file system access to the risk handling routines. When these are accessed through a gate, the needed code and data is made available. The time needed to perform this depends upon the particular action. However, a non-hierarchical system can be implemented so that entering a guarded region will take less than 30 microseconds.

DESCRIPTION OF THE PREFERRED EMBODIMENT

Introduction

The Motorola 68010 and 68020 virtual memory microprocessors provide a computing nucleus for constructing supermicrocomputer systems with the performance of high-end minicomputers like the VAX (Digital Equipment Corporation). A computing nucleus becomes a high performance computer only after it is placed in a design which meets desired performance specifications. This task challenges the designer to find VLSI components which allow the theoretical performance of the nucleus to be the actual performance of the real system.

The ideal performance of a microprocessor always degrades in real system design, because of the delay inherent in the processor's memory management technique as well as in the associated system memory and its interface.

Processors have always been faster than memories. Since it is inherent in the technology, the speed mismatch can be ameliorated (but not entirely eliminated) through architectural techniques such as memory hierarchies.

In such a hierarchy, a small, fast cache memory is closest to the processor. The cache is dynamically loaded with a copy of the contents of each processor memory reference, both program and data. Typically, up to 95% of all memory read references will be found in a 16K byte cache.

Management of a cache is the first system problem addressed by the new MAC, which contains all the logic and identification memory to control a cache which can be configured by the user to between 1K byte and 32K bytes.

A second system problem is memory management. In this role, the MAC serves the full addressing range of its companion microprocessor through a flexible arrangement of memory divisions. The MAC can divide the address space in pages (the user selects the size), segments (user choice over the full address space) or paged segments (to avoid the need to locate segments in contiguous areas of memory).

Finally, the MAC provides a solution to input/output: virtual I/O. The advantage here is the creation of a virtual address bus between the microprocessor and I/O controllers. System speed goes up rapidly as a result.

Thus, the 68910 or 68920 Memory access Controllers can be regarded as a "system chip" which combines with a microprocessor to provide all the elements needed for a true high performance system. Since the MAC is the first such system element to have been integrated in this fashion, it is free of some of the restrictions that have limited previous designs. As a consequence, some new solutions to old problems have been found which speed up the system.

Architecture of the MAC

Figure 1:
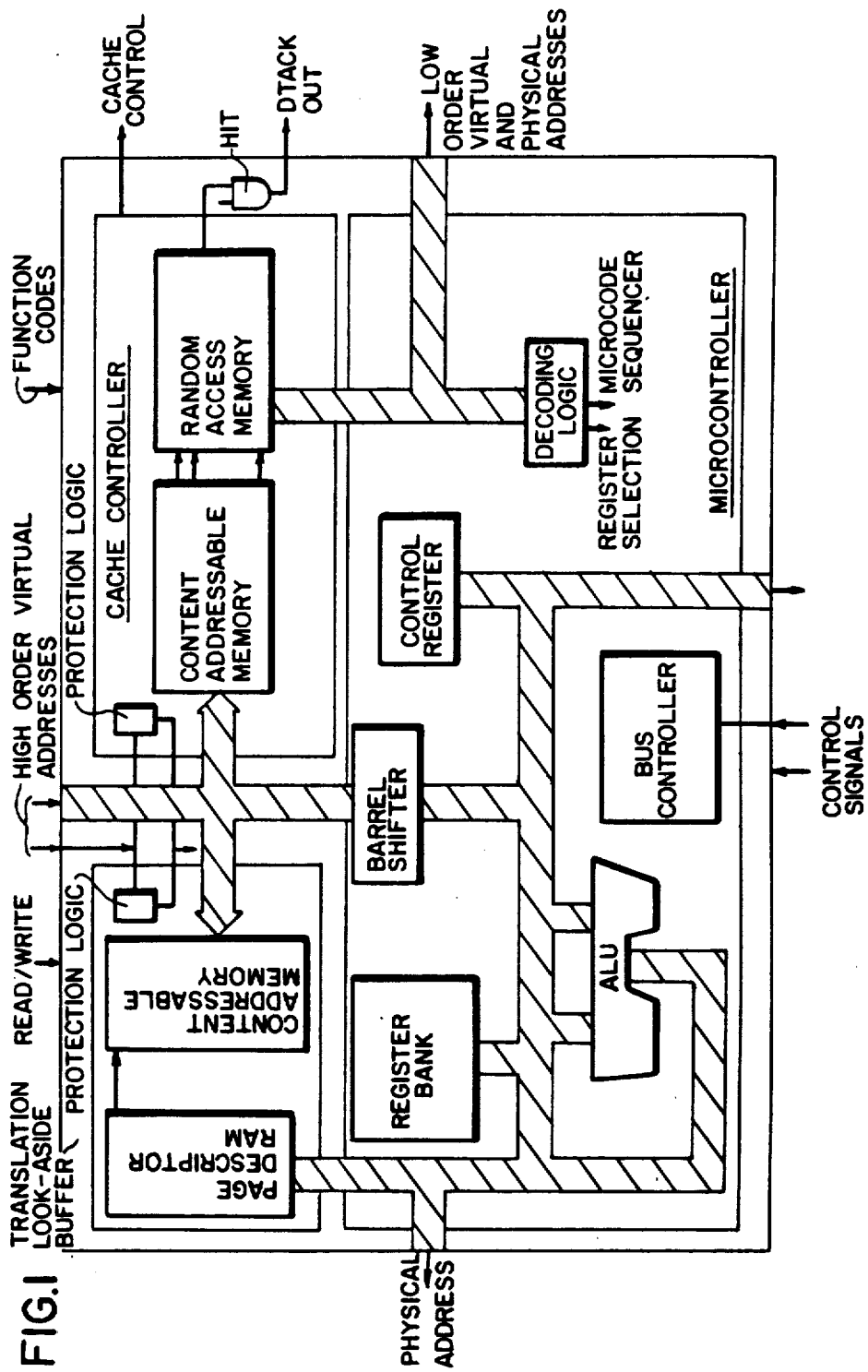
FIG. 1 is a block diagram illustrating the architecture of the Memory Access Controller in which this invention is used.
Figure 2:
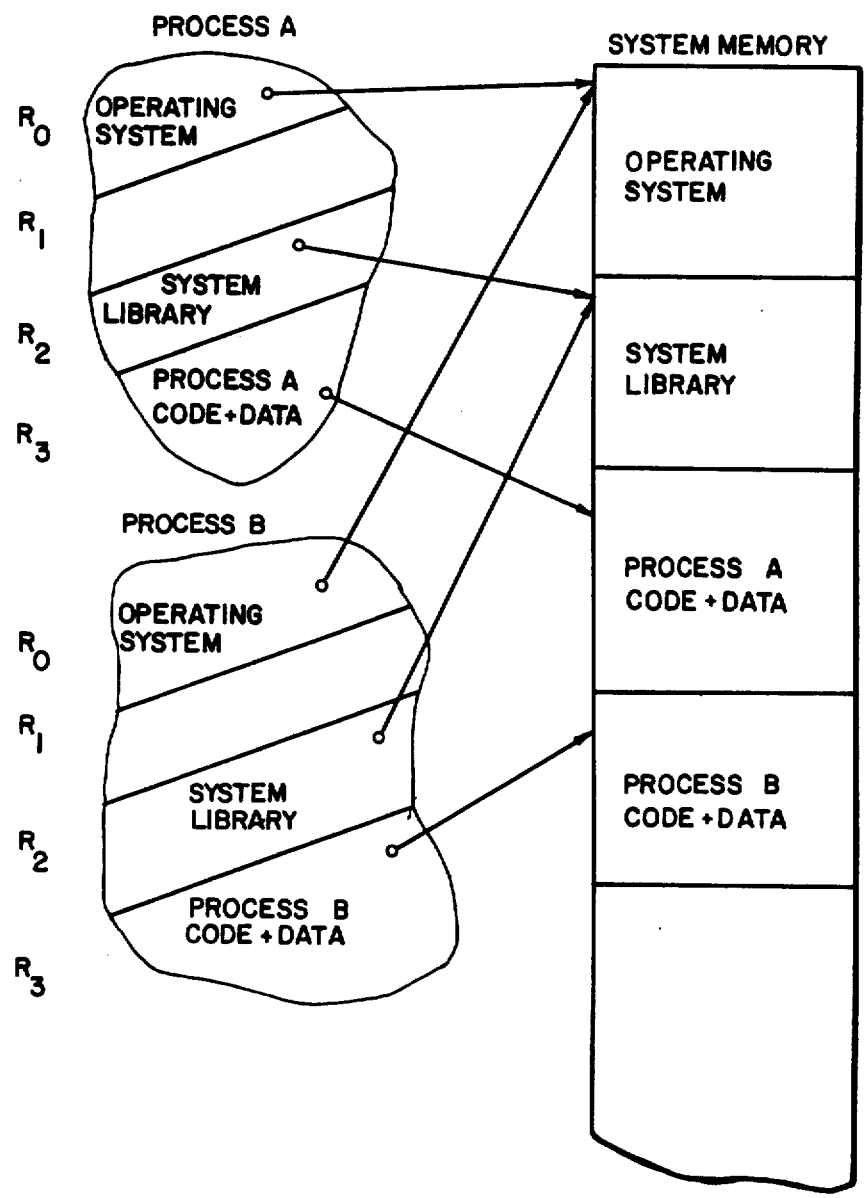
FIG. 2 is a diagrammatic illustration of the concept of regions.

The MAC's design (FIG. 1) contains three main subsystems: cache controller, translation look-aside buffer (TLB), and microcontroller. The cache controller provides all of the match and control logic for an external static RAM cache. The TLB is used to translate a virtual address into its physical address counterpart in system memory. The microcontroller is used to update the TLB on demand, and performs other functions, as well.

The cache controller and TLB speed-up the system since most reads will be supplied from the cache, many writes will be overlapped with subsequent reads and MAC MMU actions occur in parallel with MAC cache actions.

PREFERRED EMBODIMENT

The contribution of this work is the combination of the region concept with the protection domain concept to yield guarded regions. Guarded regions have the advantage of (1) giving quick access to new resources, (2) providing a form of dynamic linking of routines to manipulate these resources, and (3) providing a protected access path to a resource on a need-to-know basis. For the most part, a guarded region defines a set of resources that a process can access through supplied gates. Resources in this case should be thought of as routines that manipulate data structures, as well as new gates for other resources. Initially, a process will start off with a defined set of gates associated with its guarded region. Access to a resource in that region through a gate using a domain call results in the redefinition of the contents of the region's address space. There is no other way that the process can access the resource, since the resource is not (initially) in the process's address space. Moving from domain to domain in a guarded region is essentially a tree-walking activity, where an access path to a resource corresponds to a branch of the "access tree." Guarded regions are useful in changing definitions of routines in a transparent, protected manner. For instance, a program may use primitives "add", "delete", "insert" on a particular data structure and make reference to certain gates for these primitives. Sometime later the underlying data structure may be changed, but the same gate numbers can be used if there is a domain change to an analogous set of gates for that new data structure. This facility could be useful in menu-like systems. Thus, changing domains can result in a different binding of gate number to routine, effectively yielding a dynamic linking facility.

A gate contains a segment table pointer, a segment table length, and an entry point. When a program addresses a gate for a region, if permission is granted, the region is redefined by a new segment table referenced through the gate's segment table pointer and segment table length fields, and the program counter is set to the gate's entry point. The user process is now executing code in a region whose contents has just been redefined. When returning from this gate call, the process picks up from the point after the gate call. Just like subroutine calls, gate calls can be nested.

Thus, gates are capabilities to routines that cannot be gotten to in any other way. The guarded region containing these routines is not initially a part of the process's address space, but temporarily becomes a part of it. This is in distinction to the approach of rings of protection where all routines are in a process's address space, but without the appropriate gate at the right ring level, access cannot be achieved.

Guarded regions are a way of insuring that operations and their data structures can be protected against improper access. A guarded region is a address space (or domain) which may only be entered through a gate or gates. A gate is a capability (or key) for a particular access. Without such a capability this access is not possible. A gate provides enough information to redefine the contents of the address space associated with a region as well as to define the chosen execution entry point into this new address space. Since the new address space will also contain gates, gates provide a tree-like access path through successive address space domains. A gate is comprised of a gate descriptor and a gate module. A gate descriptor is composed of a segment table pointer, a segment table length, and an entry point. The entry point is associated with the routine being accessed in the guarded region. Gate descriptors are kept in a special segment that is known as a gate segment. For simplicity, in our description we will restrict gates to a particular region (i.e. Region 2). A gate module consists of the code that performs the gate functions and a control stack for keeping track of previous gate entrances.

A change domain instruction is used to transfer from one domain to another in a guarded region. The argument to this instruction is the gate number. In our implementation, processing a change domain instruction causes the following actions:

1. The gate number is used to access the gate segment to find the associated gate descriptor. If the gate descriptor is not valid, then a fault is generated.
2. The present program counter contents are pushed onto a special control stack.
3. The present contents of the Region 2 segment table pointer and segment table length registers are pushed onto the special control stack.
4. The gate is accessed and the new segment table pointer and segment table length descriptors are placed in their associated Region 2 registers.
5. The gate entry point is placed in the program counter.

A return domain instruction is used to return from a called domain in a guarded region. Basically, the old values of the Region 2 segment table pointer and segment table length are popped from the control stack and restored to their associated Region 2 registers, and the return address is popped from the control stack and placed in the program counter.

The concept of a protection domain, that is, a protected address space, may have many embodiments employing different combinations of hardware and software. In what follows, we will present an embodiment of protection domains, known here as guarded regions, within the context of a 68000-based microprocessor system with a memory access controller (MAC) providing the memory management function. The domain entry/exit mechanism requires some extra hardware resources: an in-progress bit which reflects the status of a domain operation. Domains can only be accessed through gates. A gate is an addressable object consisting of a gate descriptor and a gate module. The gate module operates on the gate descriptors to perform domain changes. Gate descriptors are contained in a segment known as a gate segment. A gate descriptor consists of the following fields: (1) region segment table pointer, (2) region segment table length, (3) domain entry point, and (4) validity field.

| 31 | 15 | 0 |
|---|---|---|
| V | Not Used | Segment Table Length(STLR) |
| | Segment Table Pointer(STPR) | |
| | Entry Point | |
| | Reserved | |

A gate descriptor is sixteen bytes long and is valid if $v=0$. In a gate segment, gate descriptor i is associated with gate i. Thus, when a gate descriptor is accessed via a domain call, the v bit of this descriptor determines whether the gate is valid. To protect against being accessed other than through a domain call, indirect gate descriptors have their permission bits E (execute) and W (write) bits set to zero and their R (read) bits set to one. Thus, any direct access other than a read will cause a fault. Reading a gate segment will cause no harm.

A gate module is a special segment comprised of code to execute domain change operations and a control stack to previous domain calls. This special segment has no execute (E), read (R), or write (W) permissions set. Thus, any access will cause the MAC to take some remedial action.

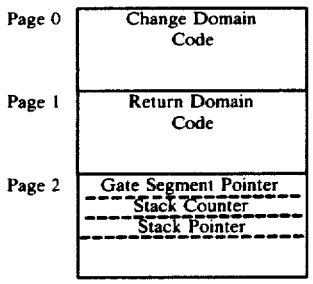

Calling a domain should be an indivisible action. A standard jump subroutine instruction JSR may be used to start the process.

JSR (A$_n$)

Here the contents of address register A$_n$ are placed in the program counter (PC) and the address following the JSR instruction is pushed onto the system stack. The contents of register A$_n$ must reference the first page of the gate module—the change domain code. After the JSR instruction is executed, the next instruction fetch will cause the MAC to process a descriptor with no access permissions $E=R=W=0$. Ordinarily, this would result in an access violation. But an access violation is avoided for a domain change under the following circumstances:

1. The address applied to the MAC has a page number of 0 and an offset of 0.
2. The access is a program and read access.
3. The in-progress bit is not set.

If any of these conditions are not true, then an access violation results, otherwise the in-progress bit is set and the domain change starts. The in-progress bit affects the MAC protection mechanism in that while it is set all accesses are valid regardless of required permissions. The address in A$_n$ is the first of the gate module control code. After passing the MAC protection, the control program can be executed free from access violations. This enables the control program to access all of the MAC's registers without being in the supervisory state. Needless to say, the control program must be trusted code. The in-progress bit also prevents a change domain instruction from being executed for a process before the previous change domain instruction for the same process has completed. The in-progress bit will be set upon exit from the control program. The control program will take the following steps:

1. Decrement gate module stack pointer and increment stack counter.
2. Move return address from user stack to gate module stack.
3. Get gate number from top of user stack and access gate segment specified in gate module page 2.
4. If gate descriptor in gate segment associated with the gate number is not valid, then generate a fault.
5. Otherwise, access new STPR, STLR, and entry point in the gate descriptor.
6. Place the old STPR and STLR in the gate module stack.
7 Place the domain entry point in register A$_0$.
8. Place the STPR and STLR from the gate descriptor into the associated region 2 registers.
9. Execute the instruction.

JMP MACaddress where MACaddress is

| 31 | 9 | 6 | 1 |
|---|---|---|---|
| MAC Address | RN | RA | |

When MACaddress is fetched from memory, the MAC will be selected and will perform command RA. Command RA flushes region RN (in our case region 2), resets the in-progress bit, and returns the following instruction:

JMP (A$_0$)

At this point, the CPU will execute the jump instruction and the PC will be positioned to execute the right instruction in the new domain.

Returning from a domain should be an indivisible action. A standard jump instruction JMP may be used to start JMP (A$_n$)

Here the contents of address register A$_n$ are placed in the program counter (PC). The contents of register A$_n$ must reference the second page of the gate module. After the JMP instruction is executed, the next instruction fetch will cause the MAC to process a descriptor with no access permissions. Ordinarily, this would result in an access violation. But an access violation is avoided for a domain change under the following circumstances:

1. The address applied to the MAC has a page number of 1 and an offset of 0.
2. The access is a program and read access.
3. The in-progress bit is not set.

If any of these conditions is not valid, then an access violation results, otherwise the in-progress bit is set and the return starts. The in-progress bit affects the MAC protection mechanism in that, while it is set all accesses are valid. The address in A$_n$ is the first of the gate module return control code. After passing the MAC protection, the control program can be executed free from access violations. This enables the control program to access all of the MAC's registers without being in the supervisory state. Needless to say, the control program must be trusted code. The in-progress bit also prevents another domain instruction from being executed for the same process before the previous one has completed. The in-progress bit will be set upon exit from the control program. The control program will take the following steps:

1. Get the old STPR and STLR and the return address from the control stack.
2. Put the return address in register A$_0$.
3. Restore the old STPR and STLR.
4. Execute the instruction JMP MACaddress where MACaddress is

| 31 | 9 | 6 | 1 |
|---|---|---|---|
| MAC Address | RN | RD | |

When MACaddress is fetched from memory, the MAC will be selected and will perform command RD. Command RD flushes region RN (in our case region 2), resets the in-progress bit, and returns the following instruction:

JMP (A$_0$)

At this point, the CPU will execute the jump instruction and the PC will be positioned to execute the right instruction in the old domain.

The control stack is a simulated stack. It is entirely contained within a page of the gate module. It consists of a stack pointer, a stack counter, and an associated stack data area. Pushing an element onto the stack consists of decrementing the stack pointer and using it to index into the stack data structure in order to place the new stacked data. In addition, the stack counter is incremented. The stack counter determines the number of elements on the stack. Popping an element from the stack involves using the stack pointer to index into the stack data area, accessing the data item, and then incrementing the stack pointer. In addition, the stack counter is decremented.

The 68020 has an internal instruction cache. In order for the domain scheme to work correctly, this cache must also be accounted for on domain entry and domain exit. This means some additions to the call domain and return domain commands. Flushing the cache is a problem, since the command to do it must be executed in supervisory mode. Thus the cache will not be flushed by the MAC. There is an external pin on the 68020 that, when asserted, causes the 68020 to bypass its internal cache. This signal will be asserted on the first in a series of domain calls and disasserted on the last return from this series of domain calls. An internal flip-flop will handle this generating. On the first domain call the MAC sets the flop-flop and on the last domain call the MAC resets the flip-flop. In the software there is a domain counter, i.e. the stack counter, which is initially set to 0. On a change domain command the counter is incremented while on a return domain command the counter is decremented. A counter transition from 0 to 1 causes the external flip-flop to be set, while a counter transition from 1 to 0 causes the external flip-flop to be reset. This internal flip-flop can be indirectly addressed through the MAC. It is up to the software to flush the 68020 cache to avoid the stale data problem across context switches.

Commands are necessary to read and write the in-progress bit. These commands are RI and WI. Command RI reads and resets the in-progress bit, while command WI writes the in-progress bit.

Something must be done to the in-progress bit if there in an interrupt taken during a domain operation, otherwise the interrupt routine will execute with no protection. The solution is to read and reset the in-progress bit on entry to the interrupt routine and to restore the in-progress bit on return from the interrupt routine.

The change domain command can be implemented with the following 68000 code:

| | | | |
|---|---|---|---|
| movea.l | stackcntr,A$_0$ | get stack counter | 16(4/0) |
| addq.l | #1,A$_0$ | increment stack counter | 8(1/0) |
| lea.l | stackcntr,A$_1$ | get stack counter address | 8(2/0) |
| move.l | A$_0$,(A$_1$) | update stack counter | 12(1/2) |
| movea.l | stackpointer,A$_0$ | get simulated stack pointer | 16(4/0) |
| addq.l | #2,A$_0$ | increment stack pointer | 8(1/0) |
| move.l | (A7)+,(A$_0$) | put return address in stack | 20(3/2) |
| move.l | (A7)+,D$_0$ | get gate # | 12(3/0) |
| asl.w | #4,D$_0$ | multiply by 16 | 10(1/0) |
| move.l | gatesegment,A$_1$ | get gate segment address | 16(4/0) |
| adda.l | D$_0$,A$_1$ | compute gate address | 8(1/0) |
| move.l | (A$_1$),D$_0$ | get first word of gate | 12(3/0) |
| bmi.l | error | error if invalid v=1 | 10(2/0) |
| addq.l | #2,A$_0$ | increment stack pointer | 8(1/0) |

-continued

| | | | |
|---|---|---|---|
| move.l | MACadreSTPR,(A0) | put old STPR on stack | 28(5/2) |
| addq.l | #2,A0 | increment stack pointer | 8(1/0) |
| move.l | MACadrSTLR,(A0) | put old STLR on stack | 28(5/2) |
| lea.l | stackpointer,A2 | get stack pointer address | 8(2/0) |
| move.l | A0,(A2) | update stack pointer | 12(1/2) |
| move.l | (A1)+,MACadrSTLR | put new value in STLR | 28(5/2) |
| move.l | (A1)+,MACadrSTPR | put new value in STPR | 28(5/2) |
| move.l | (A1),A0 | put entry address in A0 | 12(3/0) |
| jmp.l | MACadrE | prepare to jump to entry point | 12(3/0) |
| ↓ resultant instruction | | | |
| jmp.l | (A0) | jump to entry point | 8(2/0) |

The change domain command takes 336 clock cycles. Here it is assumed the registers A0,A1,A2 and D0 are saved on entry to a new domain and are restored on return from that domain. The return domain call can be implemented with the following 68000 code:

| | | | |
|---|---|---|---|
| move.l | stackcntr,A1 | get stack counter | 16(4/0) |
| beq.l | error | one domain return too many | 10(2/0) |
| subq.l | #1,A1 | decrement stack counter | 8(2/0) |
| lea.l | A1,(A0) | update stack counter | 12(1/2) |
| movea.l | stackpointer,A1 | get simulated stack pointer | 16(4/0) |
| move.l | (A1),MACadrSTLR | put old value in STLR | 28(5/2) |
| subq.l | #2,A1 | pop stack | 8(1/0) |
| move.l | (A1),MACadrSTPR | put old value in STPR | 28(5/2) |
| subq.l | #2,A1 | pop stack | 8(1/0) |
| move.l | A1,(A0) | put return address in A0 | 12(3/0) |
| subq.l | #2,A1 | pop stack | 8(1/0) |
| lea.l | stackpointer,A2 | get stack pointer address | 8(2/0) |
| move.l | MACadrR | prepare to return | 12(3/0) |
| ↓ resultant instruction | | | |
| jmp.l | (A0) | jump to entry point | 8(2/0) |

The return domain call takes 202 clock cycles.

Other domain returning procedures are possible. For instance, an error return domain call could pop the control stack and return to the initial program issuing the first domain call in a series of nested domain calls.

What is claimed:

1. A memory access control device for use in a data processing system, said device having a first connection for connecting to a memory for storing information and for being partitioned into a plurality of identifiable address spaces, said device having a second connection for connecting to a central processing unit for receiving therefrom virtual address information, characterized in that said device comprises:
   first programmable means to partition the virtual address space of at least one process executable on said central processing unit into at least two regions of variable lengths;
   second programmable means to allocate instructions and data to said regions;
   third programmable means to receive information having permission to access respective levels of protection and associated levels of access permission to each of said respective regions;
   fourth programmable means to receive information for assigning entry points to sub-spaces of said address space;
   address mapping means to map virtual addresses within said respective regions into physical addresses within said respective sub-spaces of physical memory;
   defining means for redefining within a predetermined region the contents of a virtual address space associated with said region by reference to a gate structure that defines a guarded region which is conditionally accessible and which gate structure also defines at least one fixed entry point for said guarded region.

2. A device as claimed in claim 1, wherein a gate comprises a gate module for performing gate operations and a gate descriptor having a segment table pointer, a segment table length, and an entry point.

3. A device as claimed in claim 1 or 2, wherein each region is defined by an associated segment table pointer and segment table length.

4. A device as claimed in claim 3, wherein the address space of a process is changed by redefinition of its segment table.

5. A device as claimed in claim 4, wherein one segment of an address space is a list of gates.

6. A device as claimed in claim 1 or 2, further including a stack for storing return information to be used upon exit from a guarded region.

7. A device as claimed in claim 1 or 2, wherein said device is contained in a single integrated circuit chip.

8. A protection scheme for use with a memory access control device used in the data processing system, said device having a first connection for connecting to a memory for storing information, said memory capable of being partitioned into a plurality of identifiable address spaces, said memory access control device having a second connection for connecting to a central processing unit from which said memory receives virtual address information, characterized in that said protection scheme comprises:
   first programmable means to partition the virtual address space of a least one process executable on said central processing unit into at least two regions of variable lengths;
   each of said regions being defined by a region descriptor having a segment table pointer register and a segment table length register;

second programmable means to allocate instructions and data to said regions;

address mapping means to map virtual adresses within a region into physical addresses within corresponding subspaces of physical memory;

third programmable means to redefine said regions by changing region descriptors;

means to map the virtual addresses of said redefined regions into physical addresses within different subspaces of said physical memory.

9. The protection scheme of claim 8 wherein said third programmable means to read define said regions by changing region descriptors comprises:

a gate segment containing a list of gates by number, said gate segment being one of said plurality of identifiable address spaces;

each of said gates being comprised of gate descriptors and gate modules, each of said gate descriptors containing a segment table pointer, a segment table length and an entry point;

said gate descriptor providing a region descriptor, an entry point into the address specified by said region descriptor and including validity checking information in the form of a valid bit;

said gate module containing instructions for performing gate functions and a control stack for keeping track of gate entrances.

10. The protection scheme of claim 9 wherein said gate module is a control means to sequence through the operation necessary to execute said protection scheme; said control unit operating on said domain stack, gate list and region descriptors.

11. The protection scheme of claim 10 wherein said domain stack contains a history of opened gates.

12. The protection scheme of claim 11 wherein said control unit upon receipt of a gate number obtains a gate; checks the validity of said gate; and transfers the prior region descriptors to the domain stack while replacing them with the region descriptor of said gate.

13. The protection scheme of claim 12 wherein said control unit executes domain change operations for the definition of a region, redefining a region by changing the physical address space to which it is mapped, and reinstating a region by remapping the address space to the first domain.

* * * * *